(No Model.)
E. O. SHEPARD & M. R. FIELDS.
CORNET OR OTHER VALVE INSTRUMENT.
No. 361,553. Patented Apr. 19, 1887.
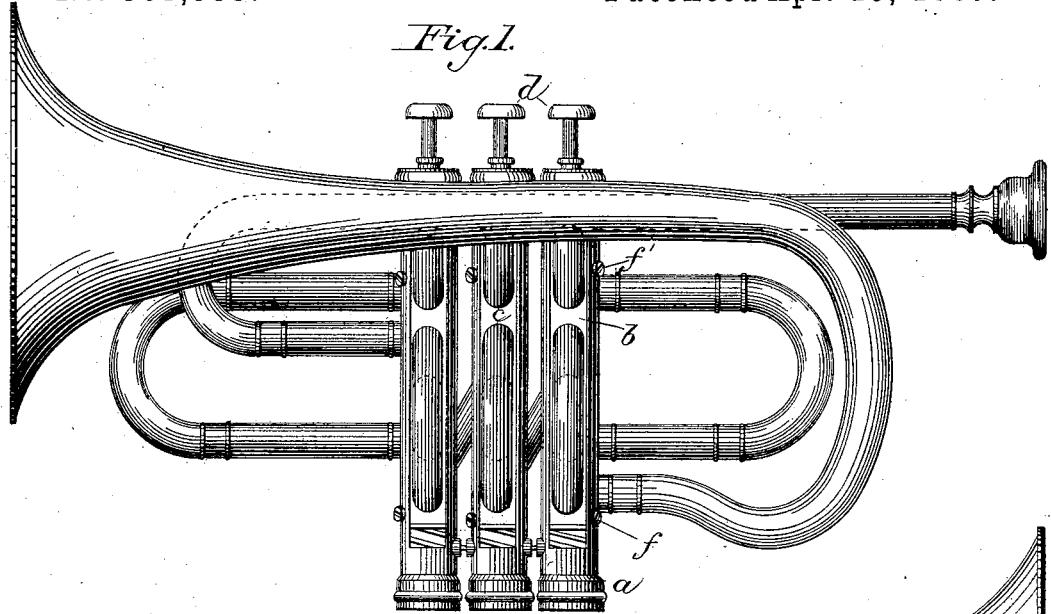
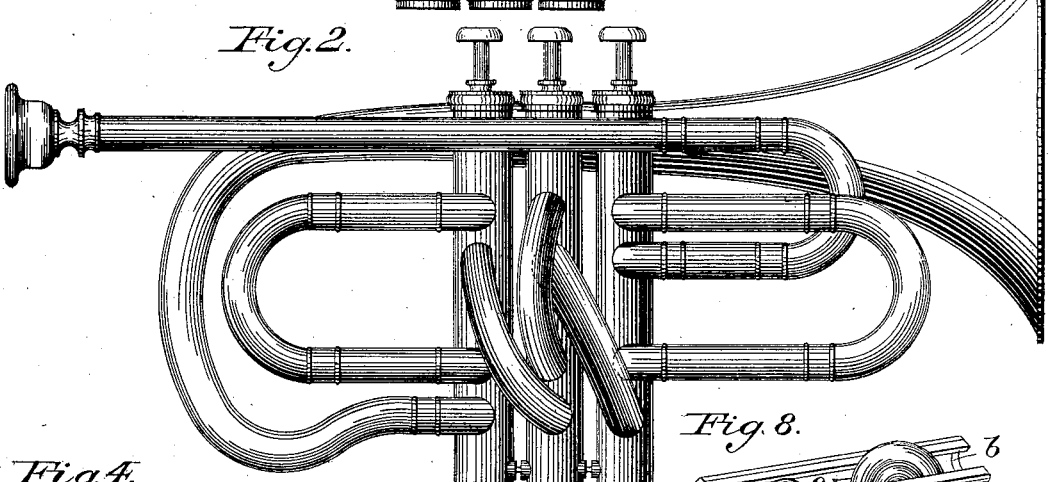
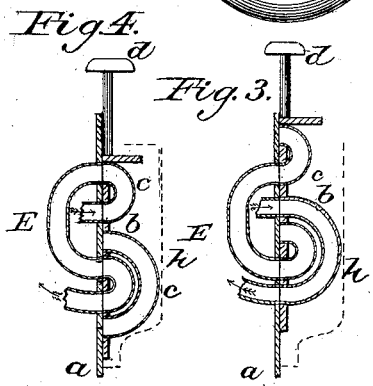
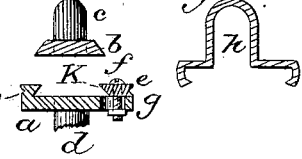
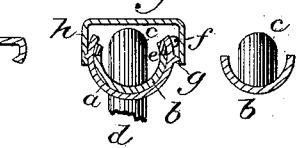
Witnesses:
Inventor:
E. O. Shepard and
Morton R. Fields
By Sheldon A. Wood, Atty.

UNITED STATES PATENT OFFICE.

EUGENE O. SHEPARD AND MORTON R. FIELDS, OF DETROIT, MICHIGAN; SAID FIELDS ASSIGNOR TO SAID SHEPARD.

CORNET OR OTHER VALVE-INSTRUMENT.

SPECIFICATION forming part of Letters Patent No. 361,553, dated April 19, 1887.

Application filed April 23, 1886. Serial No. 199,982. (No model.)

*To all whom it may concern:*

Be it known that we, EUGENE O. SHEPARD and MORTON R. FIELDS, citizens of the United States, residing at Detroit, in the county of Wayne, State of Michigan, have invented a new and useful Improvement in Cornets and Wind-Instruments of the cornet class, of which the following is a specification.

Our invention relates to certain improvements in the valves of all wind-instruments, whereby the different tones are produced by means of valves or slides, the object of which is to vary the length of the tubing through which the air-current passes.

The objects of our invention are—

First. An instrument in which the bore is clear and unobstructed where it passes through the valves, and of same diameter as the tubing attached to said valves, an object never before attained.

Second. A cornet in which the valve-tones are not inferior to the "open" tones, a result heretofore unaccomplished.

Third. An instrument in which the tubing makes no short turns, securing a better tone and blowing easier than formerly.

Fourth. A shorter action, as the valve travels a much shorter distance than heretofore, yet does not "choke" the tubing.

Fifth. Less friction, the rubbing-surfaces being one third as great as formerly and the valve much lighter in weight, so securing that desirable quality known as a "light action" more perfectly than possible as the valves have been heretofore constructed.

Sixth. Adjustability to wear. As formerly constructed cornets and instruments of that class were short-lived, as the valves soon wore, then became loose and leaked, and were worthless. A new set was then the only remedy. In our valve all wear can be taken up by a simple adjustment, and the cornet improves with age, as friction and wear bring the surfaces closer and make the action tighter.

Seventh. An instrument easier to keep in good order, as by removing the valve the tubing is all accessible and in full view. The valve never sticks, a very desirable quality and one never before secured.

Eighth. Cheaper production, as skilled labor is not requisite, and fitting the parts is easily done in one-tenth the time formerly required.

Ninth. Silent action, there being no clicking sound discernible during the action of the valve.

We attain these objects by means of the method of construction illustrated in the accompanying drawings.

Figure 1 represents the improved valves as applied to a cornet, the variety known as "E♭." Its application to all other wind-instruments of this class will be substantially the same. Fig. 2 presents the reverse view. Figs. 3 and 4 present sectional views of the valve, and show the path of the air-current, first, when the valve is in normal position, Fig. 3, and second, when depressed, Fig. 4. Fig. 5 sents a sectional view of the valve seen from the end. Fig. 6 is a covering for the valve.

In some instruments economy of space, general appearance, and mode of application may render it desirable to fit the piston into a semi-cylindrical bearing; in others, a flat bearing. The principle in both forms and the air-passages are precisely identical. In Figs. 1, 2, and 7 the piston and bearing are represented as semi-cylindrical. In Figs. 3 and 4 the flat form is given, as the air-passages can be more easily illustrated. Fig. 8 gives a side view of the valve represented in the receptacle, as shown in Fig. 7.

Taking Fig. 1, $a$ represents the receptacle for the valve $b$, carrying the short tubes $c$. $f$ represents the set-screws, holding in place the adjustable valve-guide hereinafter described.

In Fig. 2 the cornet is reversed, and shows how the tubing called the "crooks" is attached to the backing or receptacles in which the pistons rest.

In Fig. 5 a sectional view of the valve or piston (the words "valve" and "piston" being used to express the same meaning, as is customary) is given, and shows how the valve $b$, carrying the short tubes $c$, is received into the receptacle $a$ and moves in the slot, as shown, the side $k$ being a guide, holding valve in place, movable and adjustable by means of a transverse slot in said guide, through which passes the set-screw $f$, screwing into the receptacle for valve $a$, so allowing guide to be moved forward and fit more closely to the valve in case of wear. The piston or valve will be protected by some suitable covering fastened to the backing, as Fig. 6, and sliding in slots $g\,g$, Fig. 5, or attached in some convenient manner. For illustrating the operation of the valve, the middle or "second" has been chosen, as it carries the shortest crook, E, and is shown in Figs. 3 and 4.

Fig. 3 shows the passage of air when the valve is in normal position. It passes through the longest tube on the piston or valve, and takes the direction shown by the arrows. $h$ represents some suitable covering or protection, as described substantially.

In Fig. 4, the valve being depressed by the performer, the air passes, by means of the two shorter tubes on the valve, through the crook E, and so the air-passage is lengthened. In the use of the curved or semi-cylindrical valve the principle is precisely the same, as shown in Fig. 7, the air-passages being identical as employed in the flat valve, and Fig. 7 being a mere reproduction of Fig. 5, with curved valve instead of flat. In this figure, $b$ represents the valve carrying the tubes $c$. $k$ is the adjustable side or guide held in place by set-screws, one of which only can be shown in sectional view, (represented as $f$,) which draws the guide firmly against the valve-receptacle $a$, and the guide is adjustable by means of a transverse slot in the valve receptacle or casing, through which said set-screw $f$ passes. By loosening the said set-screw the said guide can be pressed against the valve, thus compensating for any wear, and by tightening said screw the guide is firmly held. The valve is protected by some suitable covering, $h$, substantially as shown.

Fig. 8 is a side view of the piston when curved, and represents the valve depressed.

The flat and partially-curved valves involve precisely the same principles and operate identically in the same manner. Springs will be attached in some convenient and suitable manner to raise the valve after use.

What we claim as our invention is—

1. A piston or slide valve, $b$, for cornets or other valve-instruments, pierced with six holes and bearing tubes $c\,c\,c$, two short and one longer tube attached to said holes, in combination with the air-pipe E, attached to the casing for said valve or piston, said valve or piston to be protected by a covering, $h$.

2. A valve or piston, as above described, adjustable to wear by means of a guide, $k$, adjustable by the set-screws $f\,f$.

E. O. SHEPARD.
MORTON R. FIELDS.

Witnesses:
THOS. H. MURPHY,
S. S. GRINDROD.